United States Patent [19]

Yamanami et al.

[11] Patent Number: 5,028,745
[45] Date of Patent: * Jul. 2, 1991

[54] POSITION DETECTING APPARATUS

[75] Inventors: Tsuguya Yamanami, Okegawa; Takahiko Funahashi, Kuki; Toshiaki Senda, Okegawa, all of Japan

[73] Assignee: Wacom Co., Ltd., Saitama, Japan

[*] Notice: The portion of the term of this patent subsequent to Nov. 7, 2006 has been disclaimed.

[21] Appl. No.: 403,267

[22] Filed: Sep. 28, 1989

Related U.S. Application Data

[62] Division of Ser. No. 95,702, Sep. 14, 1987, Pat. No. 4,878,553.

[30] Foreign Application Priority Data

Sep. 12, 1986 [JP] Japan ................................ 213970/61

[51] Int. Cl.$^5$ .............................................. G08C 21/00
[52] U.S. Cl. ...................................................... 178/19
[58] Field of Search ............................. 178/18, 19, 87

[56] References Cited

U.S. PATENT DOCUMENTS

| | | | |
|---|---|---|---|
| 4,711,977 | 12/1987 | Miyamori et al. | 178/18 |
| 4,786,765 | 11/1988 | Yamanami et al. | 178/19 |
| 4,848,496 | 7/1989 | Murakami et al. | 178/19 |
| 4,878,553 | 11/1989 | Yamanami et al. | 178/18 |
| 4,902,858 | 2/1990 | Yamanami et al. | 178/19 |

Primary Examiner—Stafford D. Schreyer
Attorney, Agent, or Firm—Lowe, Price, LeBlanc, Becker & Shur

[57] ABSTRACT

The position of an implement is determined relative to a tablet including a tuned circuit with a resonant frequency including coils arranged in two coordinate directions. Coils of the tablet are sequentially excited with AC energy having approximately the same frequency as the resonant frequency. The tuned circuit interacts with the AC energy to change the AC current flowing in coils of the tablet as a function of the implement position so the greatest changes in the AC current are in coils of the tablet closest to the implement. Detected values of changes in current as a function of coil position are interpolated to indicate the implement position.

44 Claims, 8 Drawing Sheets

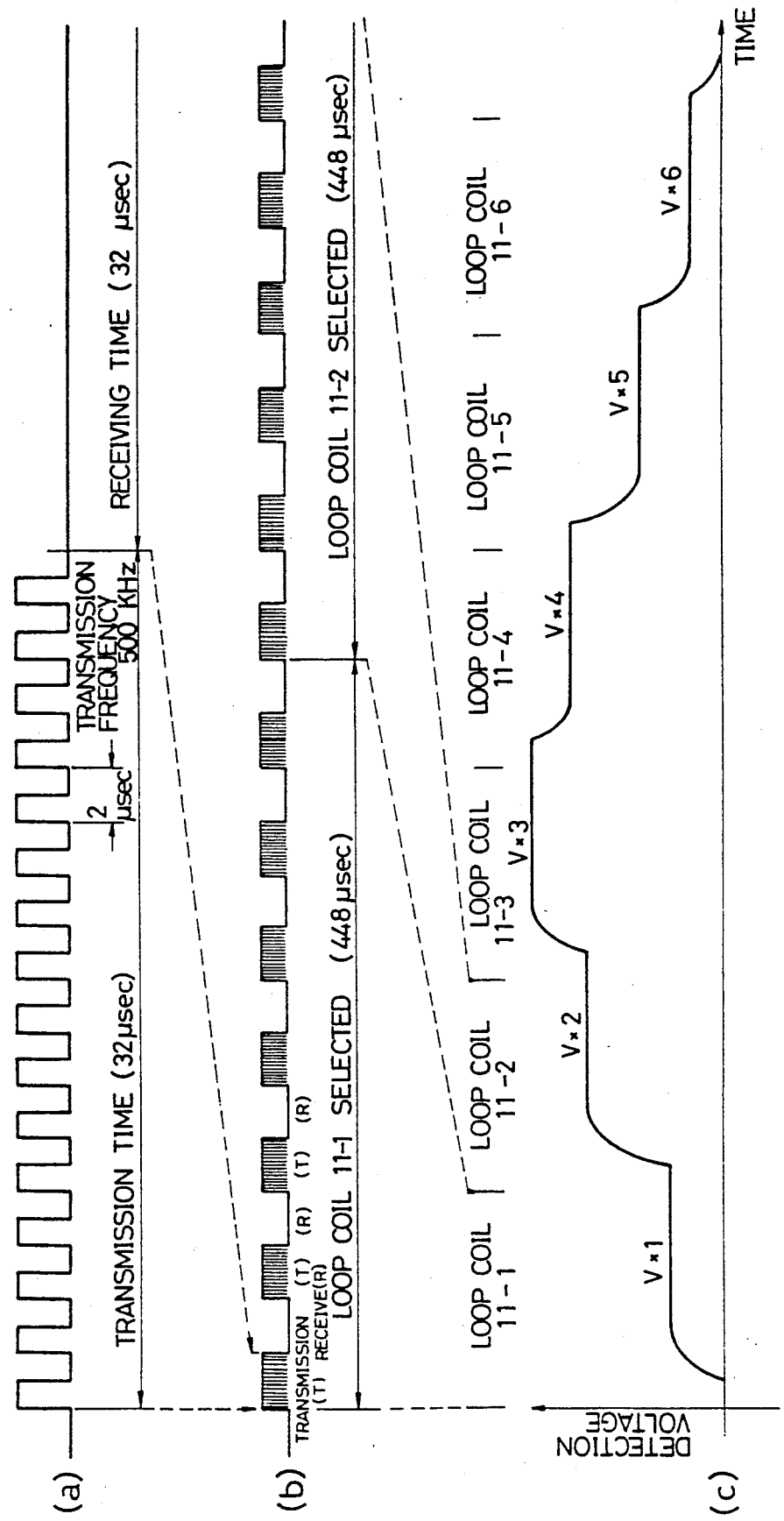

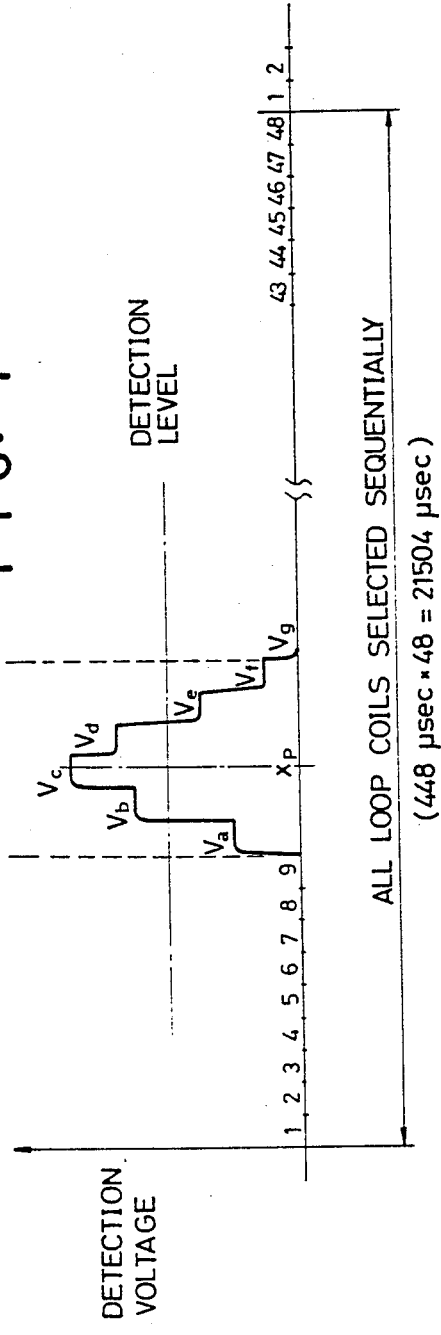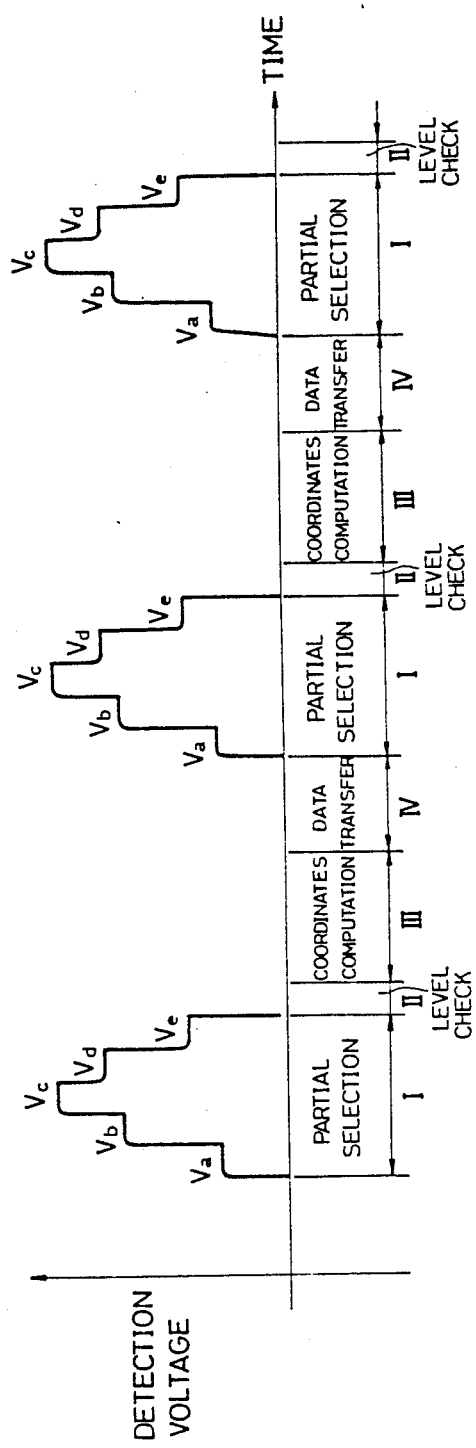

POSITION DETECTING APPARATUS

This is a divisional of U.S. application Ser. No. 095,702, filed Sept 14, 1987, U.S. Pat. No. 4,878,553.

BACKGROUND OF THE INVENTION

1. Field of the Invention

The present invention relates to a position detecting apparatus for detecting the position, pointed by a pointing device and, more particularly, to a position detecting apparatus which can detect, with a high degree of detecting precision, the position pointed by a pointer which is not connected to the body of the apparatus both electrically and mechanically.

2. Description of the Prior Art

A position detecting apparatus has been known in which an electric pulse current is supplied to a driving coil provided on one end of a magnetostrictive transmission medium or on the pointing end of a position pointer so as to generate a magnetostrictive vibration wave in the magnetostrictive transmission medium, and the position pointed by the pointer is detected by suitably processing the time between the moment at which the magnetostrictive vibration wave is generated and the moment at which a voltage induced by the magnetostrictive vibration wave in a detection coil is provided on the pointing end of the position pointer or on one end of the magnetostrictive transmission medium.

Also known is a position detecting apparatus in which a plurality of driving lines and detecting lines is arranged orthogonally to each other and a position is pointed by a pointer having a magnetic member such as ferrite, the driving lines are successively supplied with electric current and the detecting lines are accessed sequentially so that the position pointed by the pointer is identified by the position of the detecting line in which the highest voltage is induced.

The position detecting apparatus of the type mentioned first exhibits an appreciably high degree of detecting precision but the handling is undesirably restricted due to the presence of a cord which is essentially required for the purpose of exchange of timing signals between the pointer and the processing device. In addition, the position pointer has to be held substantially perpendicularly to and in the close proximity of the magnetostrictive transmission medium.

On the other hand, the position detecting apparatus of the second-mentioned type suffers from a problem in that the resolution of the coordinates position is determined by the pitch of the detecting lines. A higher resolution would be obtained by reducing the pitch of the detecting lines but such a reduced pitch will undesirably impair the S/N ratio of the detection signal, as well as the stability of detection performance, so that any increase in the resolution is materially impossible to obtain. In addition, it is rather difficult to detect the position right above each of the points of intersection between the driving lines and the detecting lines. Furthermore, the pointer has to be placed in the very close proximity of the lines.

SUMMARY OF THE INVENTION

Accordingly, a first object of the present invention is to provide a position detection apparatus incorporating a cordless pointer which is not connected to any part of the stationary portion of the apparatus, thus facilitating the handling while attaining a high degree of precision in the position detection.

In accordance with one aspect of the present invention a determination is made of the position of an implement relative to a tablet, wherein the implement includes a tuned circuit with a predetermined resonant frequency and the tablet includes coils arranged in two coordinate directions. Coils of the tablet are sequentially excited with AC energy having approximately the same frequency as the resonant frequency. The tuned circuit interacts with the AC energy to change the AC current flowing in coils of the tablet as a function of the implement position on the tablet. In response to the AC current flowing in coils of the tablet the implement position is indicated.

In the preferred embodiment implement position is indicated by detecting the phase of the current flowing in the coils. Coils of the tablet are excited during a first interval with the AC energy at the predetermined frequency. During a second interval while coils of the tablet are not excited by the AC energy at the predetermined frequency there are responses to energy coupled back to coils of the tablet from the tuned circuit. The changes ion the AC current flowing in coils in the tablet are a function of the implement position so that the greatest changes in the AC current are in coils closest to the implement. A determination is made as to whether a response indicative of the greatest current change exceeds a predetermined value. Thereafter current from the source is supplied only to the coil having the greatest change in AC current and the coils in proximity thereto. Detected values of changes in current as a function of coil position are interpolated to indicate implement position.

In one of the embodiments, the tuned circuit is arranges so the phase of current flowing in coils of the tablet, while the implement is in proximity to a surface of the table, has first and second phases in response to the implement being pressed against and not being pressed against the surface. Phase detector means responsive to the current flowing in coils of the tablet indicates the phase of the current flowing in coils of the tablet in response to the interaction of the tuned circuit and current supplied by the source to coils of the tablet. An indication as to whether the implement is or is not pressed against the surface is derived in response to an output of the phase detector means.

In another aspect of the invention the tuned circuit is arranged so the phase of current flowing in coils of the tablet, while implement is in proximity to a surface of the tablet, has first and second phases in response to switch connecting circuit elements of the tuned circuit being respectively open and closed. Phase detector means responsive tot he current flowing in coils of the tablet indicates the phase of the current flowing in coils of the tablet in response to the interaction of the tuned circuit and current supplied by the source to coils of the tablet.

The phase detector means includes first and second phase detectors responsive to a reference wave derived from the AC source and the current flowing in coils of the tablet in response to the interaction of the tuned circuit and current supplied by the source to coils of the tablet. The first and second phase detectors respond to mutually orthogonal waves.

The coils are preferably arranged as first and second arrays of loop coils positioned to extend in the two mutually orthogonal coordinate directions.

BRIEF DESCRIPTION OF THE DRAWINGS

FIGS. 6(a), 6(b) and 6(c) are timing charts for explaining the basic position detecting operation in the embodiment shown in FIG. 1;

FIG. 7 is a graph showing the levels of voltages induced in loop coils in the first cycle of detecting operation;

FIG. 8 is a graph showing the timing of the second and subsequent cycles of detecting operation;

DESCRIPTION OF THE PREFERRED EMBODIMENTS

Figure 1:
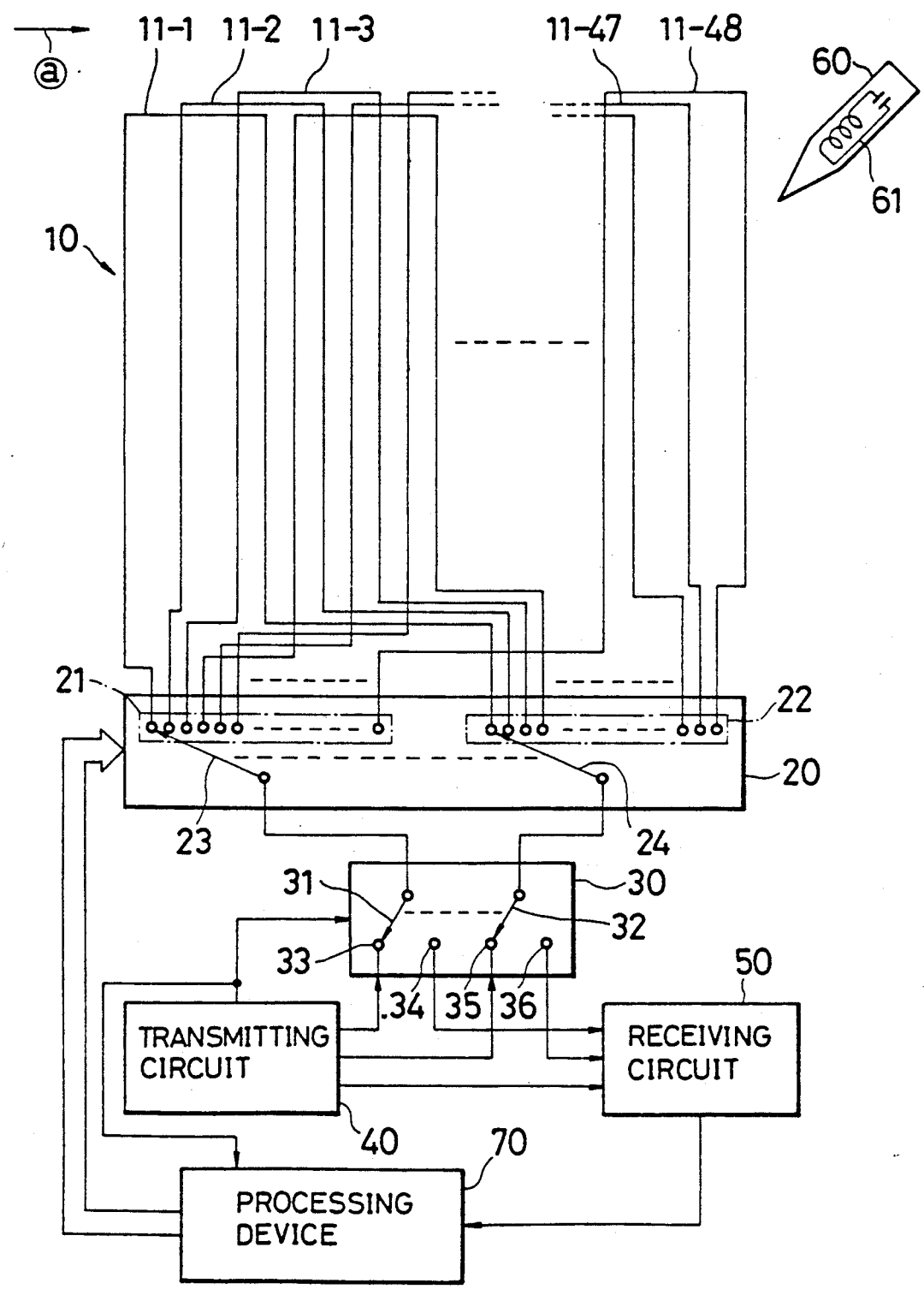
FIG. 1 is a connection and block diagram showing the basic construction of a first embodiment of the position detecting apparatus in accordance with the present invention.

Referring first to FIG. 1, a first embodiment of the position detecting apparatus in accordance with the present invention is constituted mainly by a position detecting section 10, a selection circuit 20, a receiving circuit 50, a transmission circuit 40, a connection switching circuit 30, a position pointer 60 and a processing device 70.

The position detecting section 10 includes a plurality of parallel conductors which are arrayed in a side-by-side fashion in the direction of position detection. In the illustrated embodiment, 48 loop coils 11-1 to 11-48 are arrayed in the direction of position detection shown by an arrow (a). More specifically, these loop coils 11-1 to 11-48 are arranged in parallel in such a manner as to partially overlap the adjacent loop coils. Although in the illustrated embodiment each loop coil has a single turn, this is not exclusive and each loop coil may have two or more turns.

These loop coils may be formed by forming a plurality of parallel conductors by, for example, etching on a known print substrate and then suitably connecting these conductors by jumper lines such as to form the plurality of loop coils, thereby forming the position detecting section 10.

The selection circuit 20 has a function for successively selecting one from among the plurality of loop coils 11-1 to 11-48. The loop coils 11-1 to 11-48 have one end connected to a first group of terminals 21 and the other end connected to the other group of terminals 22. The selection circuit 20 has a selection contact 23 for selecting one of the terminals 21 of the first group and a selection contact 24 for selecting one from the second group of terminals 22. The selection contacts 23 and 24 are operatively connected to each other so that they select both ends of the same loop coil, thereby enabling the successive loop coils to be selected one after another. This selection circuit can simply be constructed by combining a multiplicity of multiplexers which are known per se.

The connection switching circuit 30 is adapted to connect the loop coil selected by the selection circuit 20 alternate to the transmission circuit 40 and the receiving circuit 50. The connection switching circuit 30 has selection contacts 31 and 32 to which are connected the selection contacts 23 and 24 of the selection circuit 20 mentioned before. The connection switching circuit 30 also has terminals 33 and 35 connected to two output terminals of the transmission circuit 40 and terminals 34 and 36 connected to two input terminals of the receiving circuit 50. The selection contact 31 adapted to select one of the terminals 33 and 34 and the selection contact 32 adapted to select one of the terminals 35 and 36 are operatively connected to each other so that they are switched simultaneously to connect the selected lop coil either to the transmission circuit 40 or to the receiving circuit 50 in accordance with a later-mentioned transmission/receiving signal.

The connection switching circuit 30 also can be constructed by known multiplexers.

Figure 2:
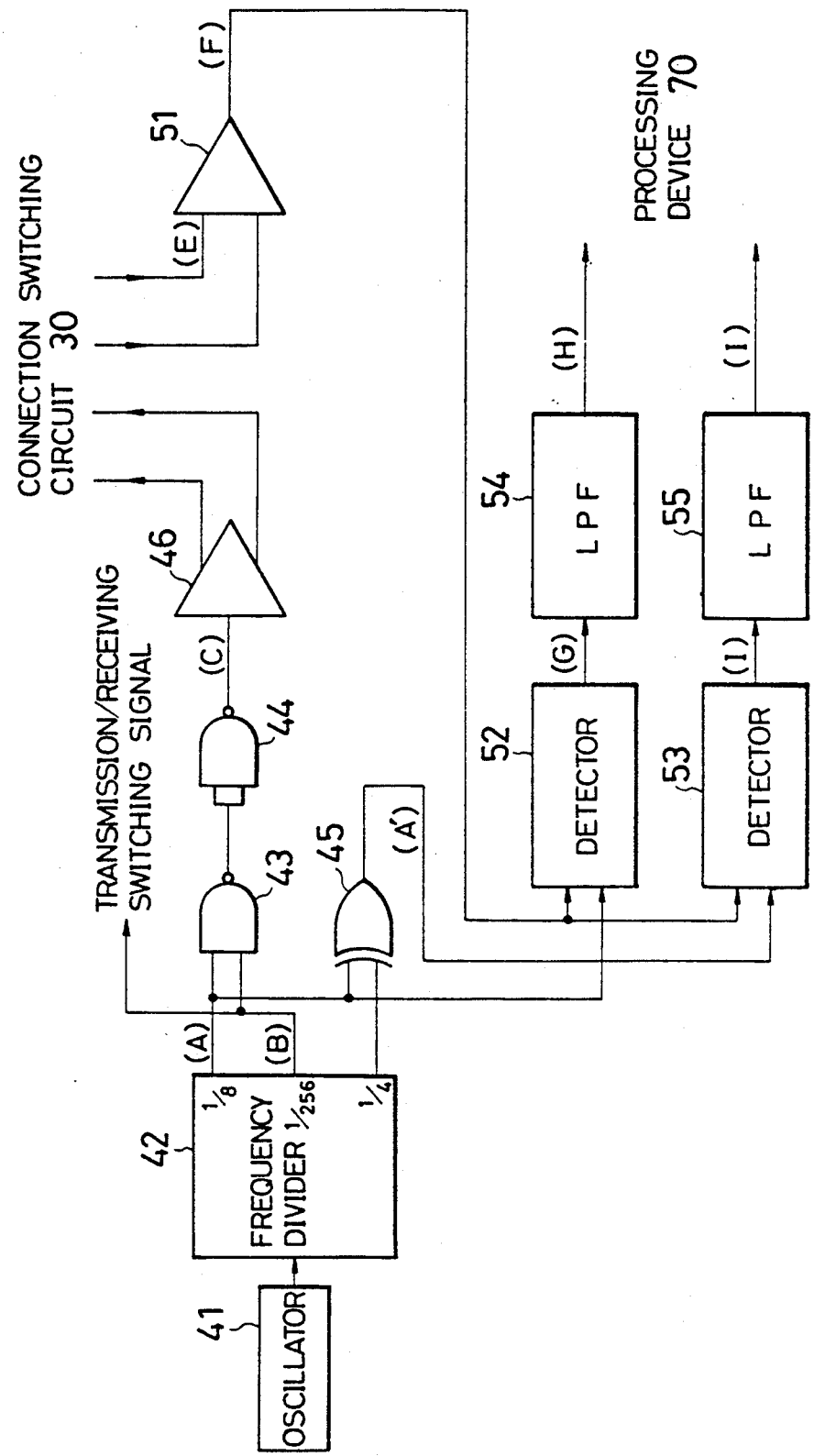
FIG. 2 is a block diagram showing the detail of a transmission circuit and a receiving circuit which are incorporated in the embodiment shown in FIG. 1.

FIG. 2 shows the detail of the transmission circuit 40 and the receiving circuit 50. The transmission circuit 40 is constituted mainly by an oscillator 41, a frequency divider 42, NAND gates 43, 44, an EXCLUSIVE OR (EXOR) gate 45 and a driving circuit 46. On the other hand. the receiving circuit 50 is mainly constituted by an amplifier 51, phase detectors 52, 53, and low-pass filters (LPF) 54, 55.

Figure 3:
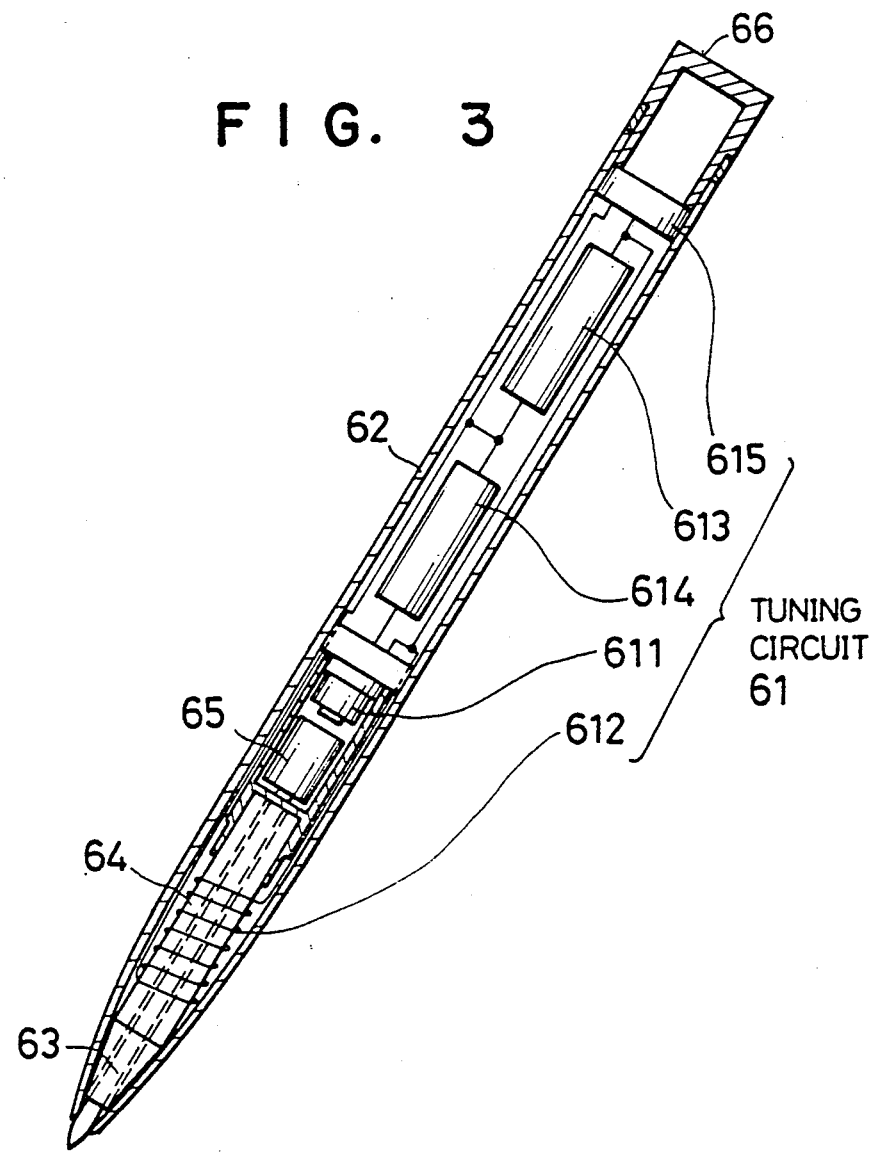
FIG. 3 is an illustration of the internal structure of an input pen.

A position pointer 60, which will be referred to as "input pen" hereinafter, has a tuning circuit 61 which includes a coil and a capacitor. As will be seen from FIG. 3, the input pen 60 has a pen holder 62 made of a nonmetallic material such as a synthetic resin. The pen holder 62 receives, as mentioned from the pointing end, a pointing member 63 similar to the core of a ball point pen, a ferrite core 64 having an aperture which slidably receives the pointing member 63, a coiled spring 65, and a tuning circuit 61 constituted by a coil 612 wound around the ferrite core 64, capacitors 613, 614 and a variable capacitor 615. The end of the pen holder 62 opposite to the pointing end is capped as by 66.

Figure 4:
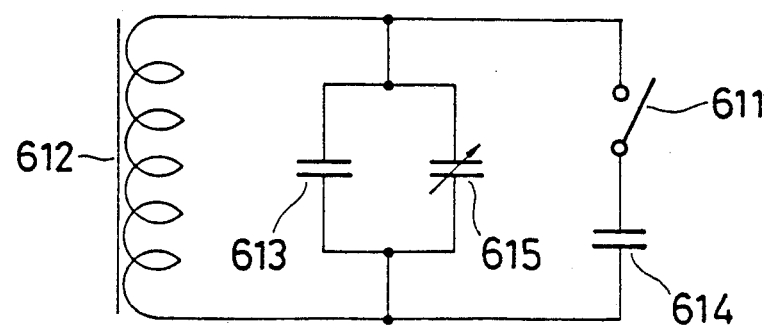
FIG. 4 is an illustration of the construction of a tuning circuit.

As will be understood also from FIG. 4, the capacitor 613 and the variable capacitor 615 are connected in parallel to each other and both ends of this parallel connection are connected to the coil 612, thus constituting a parallel resonance circuit which is known per se. The reactance and capacitances of the coil 612, capacitor 613 and the variable capacitor 615 are so determined that the tuning circuit can resonate with the frequency of the electric wave produced by the loop coil of the position detecting section 10.

On the other hand, the capacitor 614 is connected to both ends of the coil 612 through the switch 611. The capacitor 614 has a function to delay the phase of the electric current in the above-mentioned parallel resonance circuit by a predetermined angle, when the switch 611 is turned on. When the pointing end of the pointing member 63 is pressed onto the input surface (not shown) of the position detecting section 10, the switch 611 is pressed by the rear end of the pointing member 63 through the coiled spring 65, whereby the switch 611 is turned on.

The processing device 70 controls the switching between the successive loop coils in accordance with a later-mentioned transmission/receiving switching signal and the output of the receiving circuit 50.

Figure 5:
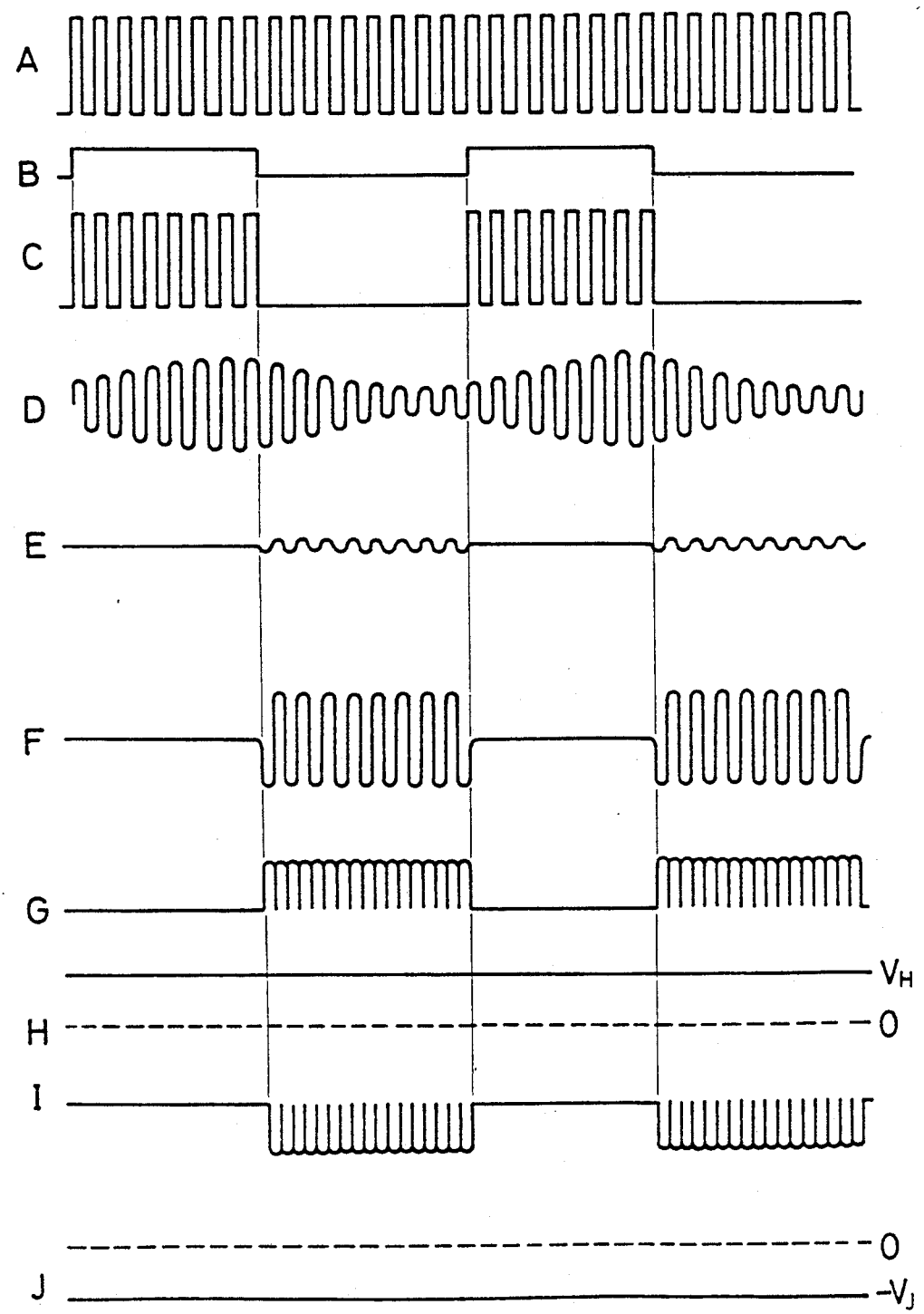
FIG. 5 is a waveform chart showing waveforms of signals obtained in various, portions of the embodiment.

The operation of this embodiment will be described hereinunder. The description will be commenced first in regard to the exchanges of electric waves between the position detecting section 10 and the input pen 60, as well as signals obtained as a result of the exchange of the electric waves, with specific reference to FIG. 5.

Clock pulses of a predetermined frequency, e.g., 4 MHz produced by the oscillator 41 are demultiplied by the frequency divider 42 into signals of $\frac{1}{4}$, $\frac{1}{8}$ and 1/256 frequencies. A pulse signal A of 500 KHz, obtained by demultiplication into $\frac{1}{8}$ frequency, is input to one of the input terminals of the NAND gate 43, while the other input terminal of the NAND gate 43 receives a transmission/receiving switching signal B of 15.625 KHz obtained by demultiplication into 1/256 frequency. The output of the NAND gate 43 is inverted through the NAND gate 44 so that a signal C, which outputs a pulse signal of 500 KHz at an interval of 32 $\mu$sec, is obtained.

The signal C is converted into a balance signal by means of the driving circuit 46 and is delivered to one 11-i of a plurality of loop coils constituting the position detection section 10 through the connection switching circuit 30 and the selection circuit 20, so that the loop coil 11-i generates an electric wave corresponding to the signal C mentioned before.

If the input pen 60 has been held in the vicinity of the loop coil 11-i of the position detecting section 10 substantially perpendicularly to the position detecting section 10, the electric wave generated by the loop coil 11-i excites the coil 612 of the input pen 60, so that a voltage D is induced in the tuning circuit 61 in synchronism with the signal C.

The receiving period begins when the duration of the signal C expires. As the receiving period starts, the loop coil 11-i is connected to the receiving circuit 50 so that the electric wave from the loop coil 11-i extinguishes without delay. However, since no change is caused in the circuit elements of the tuning circuit 61 of the input pen 60, the induced voltage is progressively attenuated.

The voltage D induced in the tuning circuit 61 generates an electric current which flows through the coil 612. In consequence, the coil 612 generates an electric wave which acts to excite the loop coil 11-i which is connected to the receiving circuit 50, so that a voltage E is induced in the loop coil 11-i.

The connection switching circuit 30 is switched by the transmission/receiving switching signal B so that it picks up the signal from the loop coil 11-i only during suspension of transmission of the signal from the loop coil 11-i. Thus, the connection switching circuit 30 delivers the signal voltage E induced in the loop coil 11-i to the amplifier 51. The amplified signal F derived from the amplifier 51 is delivered to the phase detectors 52 and 53.

The phase detector 52 also receives the pulse signal A mentioned before as a phase detecting signal. If the phase of the received signal F coincides with the phase of the pulse signal A, the phase detector 52 produces a signal G which is formed by inverting the received signal F to the positive or plus side. The signal G is converted, by the low-pass filter 54 having a sufficiently low cut-off frequency, into a flat signal H having a voltage level of VH and the thus obtained signal H is delivered to the processing device 70.

The phase detector 53 also receives, as the detecting signal, a pulse signal A' (not shown) which is formed by the EXOR gate 45 as EXCLUSIVE OR of the pulse signal A and a pulse signal which has a frequency twice as high as the frequency of the pulse signal A. Thus, the detecting signal A' has the same frequency as the pulse signal A and a phase which is 90° behind the phase of the pulse signal A. If the phase of the received signal F coincides with the phase of the pulse signal A', the phase detector 53 produces a signal I which is obtained by inverting the received signal F to the negative or minus side. The signal I is input to the low-pass filter 55 having a sufficiently low cut-off frequency so that it is converted into a flat signal J of a voltage level −VJ. The thus obtained signal I is delivered to the processing device 70.

If the switch 611 has been turned off in the input pen 60, the phases of the voltage and the current in the tuning circuit at the resonance frequency coincide with each other as explained before. In consequence, the phase of the received signal F and the phase of the pulse signal A coincide with each other. In this state, the voltage appears only in the signal H but no voltage appears in the signal J.

Conversely, if the switch 611 in the input pen 60 has been turned on, the phase of the electric current in the tuning circuit 61 is delayed by a predetermined angle from the phase of the voltage at the resonance frequency, as explained before. Consequently, the phase of the received signal F is delayed by a predetermined angle from the phase of the pulse signal A. In this case, therefore, voltages appear both in the signals H and J. It will be understood, however, that the voltage appears only in the signal J if the delay of the phase is 90°.

The signals H and J delivered to the processing device 70 are converted into corresponding digital signals and are subjected to arithmetic operation in accordance with the following formulae (1) and (2).

$$V_x = (V_H^2 V_J^2)^{\frac{1}{2}} \qquad (1)$$

$$V_\theta = \tan^{-1}(VJ/VH) \qquad (2)$$

The symbol $V_x$ represents a voltage value which is proportional to the distance between the input pen 60 and the loop coil 11-i, while $V_\theta$ represents a voltage value which is proportional to the phase difference between the voltage and the current in the tuning circuit 61 of the input pen 60.

When the loop coil 11-i which exchanges the electric waves with the input pen 60 is switched from one to another, the level of the voltage $V_x$ is changed so that the position of the input pen 60 can be detected by examining the voltage value $V_x$ as will be explained later.

On the other hand, the voltage value $V_\theta$ varies only response to the turning of the switch 611 into on and off states. It is thus possible to distinguish the states of the switch 611 by comparing the voltage value $V_\theta$ with a predetermined threshold voltage.

A description will be made hereinunder as to the position detecting operation performed by the apparatus of the present invention, with reference to FIGS. 6 to 8.

The position detecting operation is commenced as the power supply is turned on to supply electric power to the whole apparatus. The processing device 70 then delivers to the selection circuit 20 an instruction for enabling the selection circuit 20 to select the first loop coil 11-1 from among the loop coils 11-1 to 11-48 constituting the position detecting section 10, thereby connecting the loop coil 11-1 to the connection switching circuit 30. Then, the connection switching circuit 30 connects the loop coil 11-1 alternate to the transmission circuit 40 and the receiving circuit 50 in accordance with the transmission/receiving switching signal B.

In the transmission period of 32 μsec, the transmission circuit 40 delivers 16 pieces of pulse of 500 KHz to the loop coil 11-1, as shown in FIG. 6(a). The switching between the transmission and receiving is repeated seven times for each loop coil, e.g., for the loop coil 11-1, as shown in FIG. 6(b). The total period of seven cycles of switching between transmission and receiving corresponds to the period (448 μsec) over which each coil is selected.

In consequence, the phase detectors 52 and 53 of the receiving circuit 50 produce induced voltages for each of seven signal receiving periods of each loop coil. The induced voltages thus obtained are averaged by the low-pass filters 54 and 55 as explained before, and are then delivered to the processing device 70. These two types of induced voltages are processed by the processing device 70 in accordance with the formulae mentioned before so as to be converted into the detection voltage $V_{x1}$ corresponding to the distance between the input pen 60 and the loop coil 11-1.

Subsequently, the processing device 70 delivers an instruction to the selection circuit 20 for enabling the latter to select the second loop coil 11-2 so that the second loop coil 11-2 is connected to the connection switching circuit 30. Then, a process similar to that explained in connection with the first loop coil 11-1 is executed so that a detection voltage $V_{x2}$ corresponding to the distance between the input pen 60 and the loop coil 11-2 is determined and stored. The described operation is conducted for all the remaining loop coils 11-3 to 11-48 by successively connecting these loop coils 11-3 to 11-48 to the connection switching circuit 30, whereby the respective detection voltages $V_{x1}$ to $V_{x48}$ corresponding to the distances between the input pen 60 and the respective loop coils are obtained as shown in FIG. 6(c). It is to be noted, however, that FIG. 6(c) shows only some of such detection voltages.

Actually, the detection voltage appears only in several loop coils around the loop coil which is closest to the position (xp) where the input pen 60 is placed as shown in FIG 7.

When the levels of the voltages stored as explained above exceed a predetermined detection level, the processing device 70 computes the coordinates values representing the position of the input pen 60 by processing these stored voltage values, and transfers the thus-computed coordinate values to a memory section which is not shown.

When the first position detecting operation is completed in the manner described hereinbefore, the processing device 70 delivers an instruction for enabling the selection circuit 20 to select only a predetermined number of loop coils, e.g., 10 loop coils, around the loop coil which has produced the maximum detection voltage. The position detecting operation is then conducted on these selected loop coils and the coordinate value representing the position of the input pen 60 is determined and delivered to the memory section so as to renew the content of the memory section.

Meanwhile, the processing device 70 computes, not only the detection voltages $V_{x1}$ to $V_{x48}$ for the respective but also the detection voltage $V_\theta$ corresponding to the phase difference between the voltage and the current in the tuning circuit 61 of the input pen 60, and compares the thus obtained detection voltage $V_\theta$ with a predetermined threshold voltage, for each of the successive loop coils. Therefore, when the switch 611 is turned on in the input pen 60, the on state of the switch 611 is detected by the processing device 70 from the result of the comparison between the detection voltage $V_\theta$ and the threshold value, and transmits the above-mentioned coordinate value obtained at this moment to an external device such as a computer (not shown).

FIG. 8 shows the timings in the second and other subsequent cycles of detecting operation performed by the processing device 70. Referring to this figure, the period "level check" is a period in which a check is conducted as to whether the maximum value of the detection voltage reaches the aforementioned detection level, and also as to whether which one of the loop coils exhibits the maximum detection voltage. If the level of the maximum detection voltage is below the detection level, the processing device 70 stops the computation of the coordinate values and determines the central one of a plurality of loop coils which are to be selected in the next cycle of the detecting operation.

A preferred method of determining the coordinate value xp is to approximate, by a suitable function, the waveform of a curve representing the detection voltages $V_{x1}$ to $V_{x48}$ in a region around a peak of the curve and to determine the coordinates value of the peak in such a function.

For instance, referring to FIG. 6(c), the maximum detection voltage $V_{x3}$ and detection voltages $V_{x2}$ and $V_{x4}$ on both sides of the maximum detection voltage ca be approximated by a quadratic function. In such a case, the coordinates value xp of the position of the input pen 60 can be determined as follows. The coordinates values of the centers of the respective loop coils 11-1 to 11-48 are expressed by x1 to x48 and the pitch of the array of the loop coils is expressed by $\Delta x$. The following formulae are derived from the relationships between the detection voltages and the coordinate values of the respective loop coils.

$$V_{x2} = a(x2 - xp)^2 + b \tag{3}$$

$$V_{x3} = a(x3 - xp)^2 + b \tag{4}$$

$$V_{x4} + a(x4 - xp)^2 + b \tag{5}$$

where a and b represent, respectively constants which meet the condition of a<0.

It will also be understood that the following relationships exist.

$$x3 - x2 + \Delta x \tag{6}$$

$$x4 - x2 = 2\Delta x \tag{7}$$

The formulae (4) and (5) therefore can be reformed as follows on condition of the relationships shown by the formulae (6) and (8).

$$xp = x2 + \Delta x/2\{(3V_{x2} - 4V_{x3} + V_{x4})/(V_{x2} - 2v_{x3} + V_{x4})\} \tag{8}$$

It will be understood that the coordinate value xp of the input pen 60 can be determined by extracting, from the group of the detection voltages $V_{x1}$ to $V_{x48}$, the maximum value of the detection voltage as determined through the level check and the voltage values obtained immediately before and immediately after the maximum value of the detection voltage, and conducting a computation in accordance with the formulae (8) by using these three voltage values corresponding to the voltages $V_{x2}$, $V_{x3}$ and $V_{x4}$ in formula (8) and the coordinate of the loop coil which has been checked immediately before the check of the loop coil which exhibits the maximum detection voltage, i.e., the coordinate value x2 in the formula (8).

The number of the loop coils employed in the described embodiment, as well as the manner in which the loop coils are arranged, are illustrative and are not intended for restricting the scope of the invention.

Figure 9:
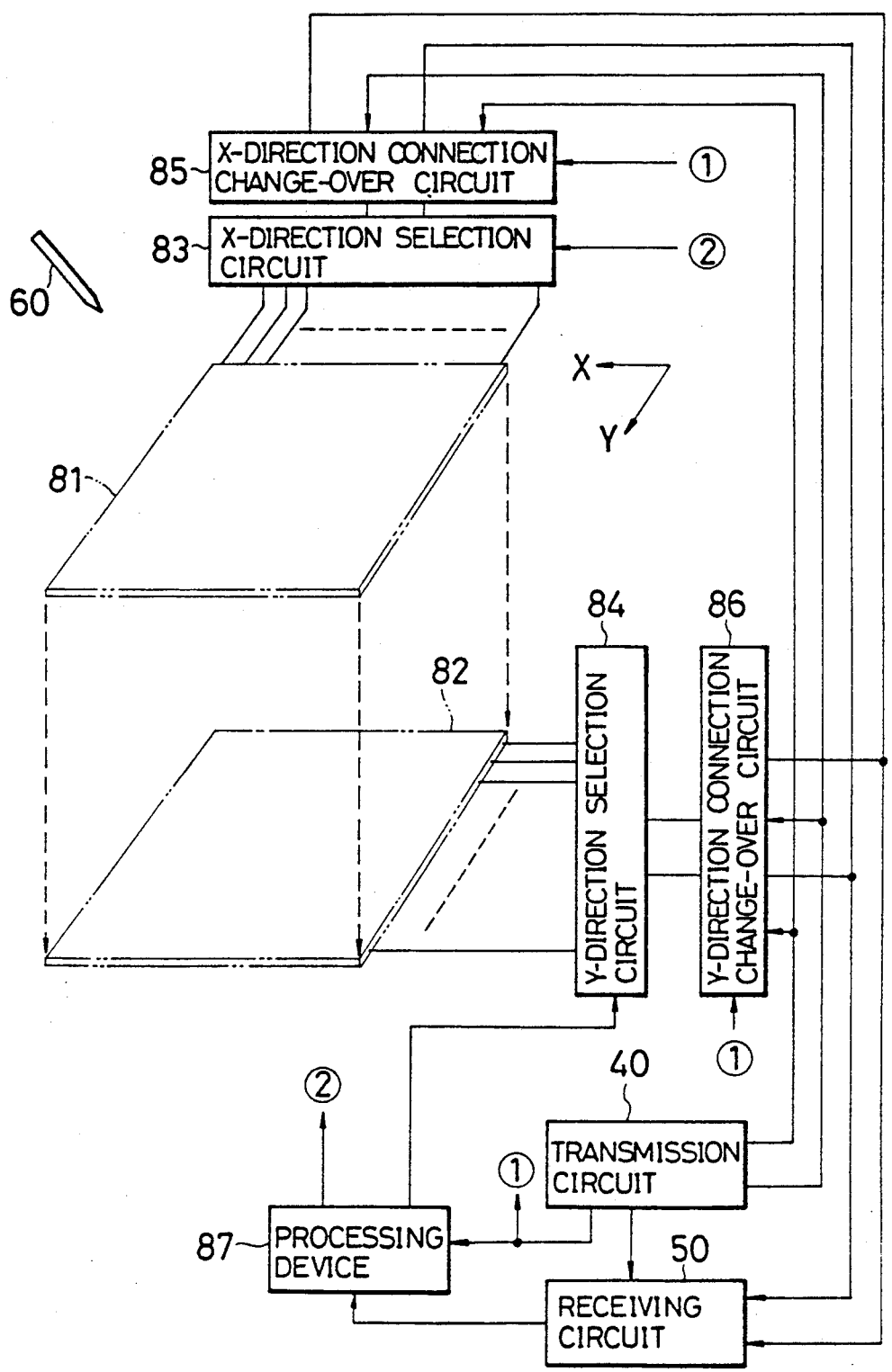
FIG. 9 is an illustration of the construction of a second embodiment of the position detecting apparatus in accordance with the present invention.
Figure 10:
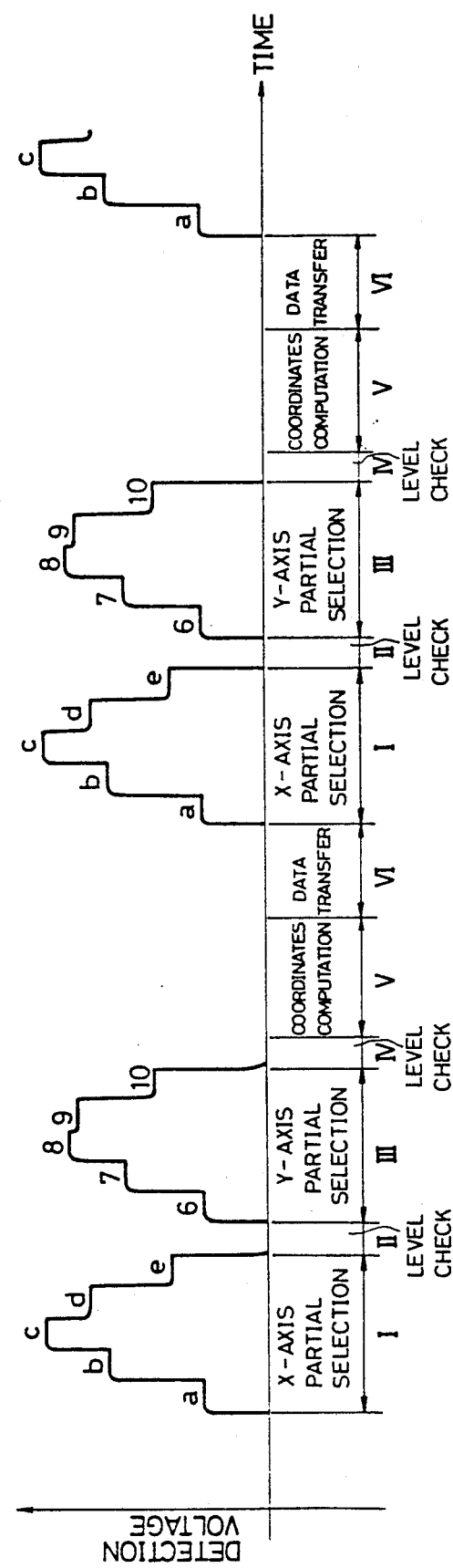
FIG. 10 is a timing chart similar to that shown in FIG. 8 but showing the timings used in the second embodiment.

FIG. 9 shows a second embodiment of the present invention designed for two-dimensional position detection. This embodiment has, therefore, X- and Y-direction position detecting sections 81 and 82, X- and Y-direction selection circuits 83 and 84, and X- and Y-direction connection switching circuits 85 and 86, which have constructions basically the same as the position detection section 10, selection circuit 20 and the connection switching circuit 30 used in the first embodiment designed for one-dimensional position detection. The constructions of these portions, therefore, are not shown in detail in FIG. 9. It is to be understood, however, that the loop coils constituting the X-direction position detecting section are arrayed in, the X-direction while the loop coils constituting the Y-direction position detecting section are arrayed in Y-direction, and these groups of loop coils are superposed so as to orthogonally cross each other. This second embodiment also incorporates a processing device 87 which is materially the same as the processing device 70 used in the first embodiment, except that it controls the position detecting operation such that the position detecting in the X-direction and the position detection in the Y-direction are conducted alternately. The timings in the second and subsequent cycles of position detecting operation performed by the processing device 87 are shown in FIG. 10.

Thus, the second embodiment of the present invention enables the position pointed by the position pointer to be detected two-dimensionally, i.e., both in X- and Y-directions, in terms of the X- and Y-coordinates values. The second embodiment further has a transmission circuit 40, receiving circuit 50 and an input pen 60 which may be the same as those used in the first embodiment.

What is claimed is:

1. A method of determining the position of an implement relative to a tablet, the implement including a tuned circuit with a predetermined resonant frequency, the tablet including coils arranged in two coordinate directions, comprising the steps of:

sequentially exciting coils of the tablet with AC energy having approximately the same frequency as the resonant frequency, the tuned circuit interacting with the AC energy to change the AC current flowing in coils of the tablet as a function of the implement position on the tablet, and responding to the AC current flowing in coils of the tablet to indicate the implement position.

2. The method of claim 1 wherein the implement position is indicated by detecting the phase of the current flowing in the coils.

3. The method of claim 1 wherein coils of the tablet are excited during a first interval with the AC energy at the predetermined frequency, and the responding step includes responding to energy coupled back to coils of the tablet from the tuned circuit during a second interval while coils of the tablet are not excited by the AC energy at the predetermined frequency.

4. A method of determining the position of an implement relative to a tablet, the implement including a tuned circuit with a resonant frequency, the tablet including a series of coils arranged in two coordinate directions, comprising:

sequentially exciting coils of the tablet with AC energy having approximately the same frequency as the resonant frequency, the tuned circuit interacting with AC energy to change the AC current flowing in coils in the tablet as a function of the implement position so that the greatest changes in the AC current are in coils closest to the implement, detecting whether a response indicative of the greatest current changes exceeds a predetermined value, thereafter supplying AC current from the source only to the coil having the greatest change in AC current and the coils in proximity thereto, and responding to the AC current flowing in coils in the tablet to indicate the implement position.

5. The method of claim 4 wherein the implement position is indicated by detecting the phase of the AC current flowing in coils of the tablet.

6. The method of claim 4 wherein the change is detected by exciting coils of the tablet during a first interval with the AC energy at the predetermined frequency, and wherein the detecting step includes responding to energy coupled back to coils in the tablet from the tuned circuit during a second interval while coils in the tablet are not excited by the AC energy at the predetermined frequency.

7. A method of determining the position of an implement relative to a tablet, the implement including a tuned circuit with a resonant frequency, the tablet including coils arranged in two coordinate directions, comprising:

sequentially exciting coils of the tablet with AC energy having approximately the same frequency as the resonant frequency, the tuned circuit interacting with the AC energy to change the AC current flowing in coils of the tablet as a function of the implement position so that the greatest changes in the AC current are in coils of the tablet closest to the implement, and interpolating detecting values of changes in current as a function of coil position to indicate the implement position.

8. The method of claim 7 wherein the implement position is indicated by detecting the phase of the AC current flowing in the coils.

9. The method of claim 7 wherein the change is detected by exciting coils of the tablet during a first interval with the AC energy at the predetermined frequency, and the implement position being indicated by responding to energy coupled back to coils of the tablet from the tuned circuit during a second interval while coils of the tablet are not excited by the AC energy at the predetermined frequency.

10. Apparatus for determining the position of an implement relative to a tablet, the implement including a tuned circuit with a predetermined resonant frequency, comprising a tablet including coils arranged in two coordinate directions, an AC source for deriving AC energy at approximately the predetermined resonant frequency, means for sequentially connecting coils of the tablet to the AC source, the tuned circuit interacting with the AC energy from the source to change the AC current flowing in coils of the tablet as a function of the implement position relative to the tablet, and means responsive tot he AC current flowing in coils of the tablet for indicating the implement position.

11. The apparatus of claim 10 wherein the means for indicating implement position includes means for detecting the phase of the current flowing in coils of the tablet.

12. The apparatus of claim 11 wherein the tuned circuit is arranged so that phase of current flowing in coils of the tablet, while the implement is in proximity to a surface of the table, has first and second phases in response to the implement being pressed against and not being pressed against the surface, and phase detector means responsive to the current flowing in coils of the tablet for indicating the phase of the current flowing in coils of the tablet in response to the interaction of the tuned circuit and current supplied by the source to coils of the tablet.

13. The apparatus of claim 11 wherein the tuned circuit is arranged so the phase of current flowing in coils of the tablet, while the implement is in proximity to a surface of the table, has first and second phases in response to a switch connecting circuit elements of the tuned circuit being respective open and closed, and phase detector means responsive to the current flowing in coils of the tablet for indicating the phase of the current flowing in coils of the tablet in response to the interaction of the tuned circuit and current supplied by the source to coils of the tablet.

14. The apparatus of claim 12 further including means responsive tot he phase detector means for indicating whether the implement is or is not pressed against the surface.

15. The apparatus of claim 14 wherein the phase detector means includes first and second phase detectors responsive to a reference wave derived from the AC source and the current flowing in coils of the tablet in response to the interaction of the tuned circuit and current supplied by the source to coils of the tablet, the first and second phase detectors being arranged to respond to mutually orthogonal waves.

16. The apparatus of claim 11 wherein the phase detecting means includes first and second phase detectors responsive to a reference wave at the predetermined frequency derived from the AC source and the current flowing in coils of the tablet at the predetermined frequency in response to the interaction of the tuned circuit and current supplied by the source to coils of the tablet, the first and second phase detectors being arranged to respond to mutually orthogonal waves.

17. The apparatus of claim 10 wherein the means for indicating implement position includes means for interpolating values of current flowing in plural ones of coils of the tablet.

18. The apparatus of claim 17 wherein the tuned circuit interacts with the AC energy to change the AC current flowing in coils of the tablet as a function of the implement position so that the greatest changes in the AC current are in coils of the tablet closest to the implement, the means for indicating means being responsive to the change in AC current flowing in coils of the tablet for indicating the implement position by detecting whether a response indicative of the greatest current changes exceeds a predetermined value and for controlling the means for connecting so AC current is supplied from the source only to the coil having the greatest change in AC change in AC current and the coils in proximity thereto.

19. The apparatus of claim 10 wherein the coils are arranged as first and second arrays of loop coils positioned to extend in the tow coordinate directions.

20. The apparatus of claim 19 wherein the loop coils of the first and second coordinate directions extend in mutually orthogonal directions.

21. The apparatus of claim 10 wherein the means for connecting supplies current from the AC source at the predetermined frequency during a first interval and the means for indicating is responsive to energy coupled back to coils of the tablet from the tuned circuit during a second interval while coils of the tablet are not excited by the AC energy at the predetermined frequency.

22. Apparatus for determining the position of an implement relative to a tablet, the implement including a tuned circuit with a resonant frequency, comprising a tablet including a series of coils arranged in two coordinate directions, an AC source for deriving AC energy at approximately the predetermined resonant frequency, means for sequentially coils of the tablet to the AC source, the tuned circuit interacting with the AC energy to change the AC current flowing in coils of the tablet as a function of the implement position so that the greatest changes in the AC current are in coils of the tablet closest to the implement, and means responsive to the change in AC current flowing in coils of the tablet for indicating the implement position by detecting whether a response indicative of the greatest current changes exceeds a predetermined value and for supplying AC current from the source only to the coil having the greatest change in AC current and the coils in proximity thereto.

23. The apparatus of claim 22 wherein the implement position is indicted by detecting the phase of the AC current flowing in coils of. the tablet.

24. The apparatus of claim 22 wherein the means for sequentially connecting excites coils of the tablet during a first interval with the AC energy at the predetermined frequency, and the means for indicating responds to energy coupled back to coils of the tablet from the tuned circuit during a second interval while coils of the tablet are not excited by the AC energy at the predetermined frequency.

25. In combination, an implement including a tuned circuit with a predetermined resonant frequency, and apparatus for determining the position of the implement relative to a surface, the apparatus including:

a tablet for carrying the surface, the tablet including coils arranged in two coordinate directions, an AC source for deriving AC energy at approximately the predetermined resonant frequency, means for sequentially connecting coils of the tablet to the AC source, the tuned circuit interacting with the AC energy from the source to change the AC current flowing in coils of the tablet as a function of the implement position relative to the tablet, and means responsive to the AC current flowing in coils of the tablet for indicating the implement position relative to the surface.

26. The combination of claim 25 wherein the means for indicating implement position includes means for detecting the phase of the current flowing in coils of the tablet.

27. The combination of claim 26 wherein the implement includes a tip adapted to bear against the surface, the tuned circuit including a reactance that is varied in response to pressure exerted by the tip against the surface.

28. The combination of claim 27 wherein the tuned circuit is arranged so the phase of current flowing in coils of the tablet, while the implement is in proximity to a surface of the tablet, respectively has first and second phases in response to the implement being pressed against and not being pressed against the surface, and phase detector means responsive to the current flowing in coils of the tablet for indicating the phase of the current flowing in coils of the tablet in response to the interaction of the tuned circuit and current supplied by the source to coils of the tablet.

29. The combination of claim 28 further including means responsive to the phase detector means for indicating whether the implement is or is not pressed against the surface.

30. The combination of claim 29 wherein the phase detector means includes first and second phase detectors responsive to a reference wave derived from the AC source and the current flowing in coils of the tablet in response to the interaction of the tuned circuit and current supplied by the source to coils of the tablet, the first and second phase detectors being arranged to respond to mutually orthogonal waves.

31. The combination of claim 27 wherein the phase detecting means includes first and second phase detectors responsive to a reference wave at the predetermined frequency derived from the AC source and the current flowing in the coils at the predetermined frequency in response to the interaction of the tuned circuit and current supplied by the source of coils of the tablet, the first and second phase detectors being arranged to respond to mutually orthogonal waves.

32. The combination of claim 25 wherein the means for indicating implement position includes means for interpolating values of current flowing in plural ones of said coils in each coordinate direction.

33. The combination of claim 32 wherein the tuned circuit interacts with the AC energy to change the AC current flowing in coils of the tablet as a function of the implement position so that the greatest changes in the AC current are in coils of the tablet closest to the implement, the means for indicating being responsive to the change in AC current flowing in coils of the tablet for indicating the implement position by detecting whether a response indicative of the greatest current changes exceeds a predetermined value and for controlling the means for connecting so AC current is supplied from the source only to the coil having the greatest change in AC current and the coils in proximity thereto.

34. The combination of claim 25 wherein the coils are arranged as first and second arrays of loop coils positioned to extend in the two coordinate directions.

35. The combination of claim 34 wherein the loop coils of the first and second coordinate directions extend in mutually orthogonal directions.

36. The combination of claim 25 wherein the means for connecting supplies current from the AC source at the predetermined frequency during a first interval and the means for indicating is responsive to energy coupled back to coils of the tablet from the tuned circuit during a second interval while coils of the tablet are not excited by the AC energy at the predetermined frequency.

37. The combination of claim 25 wherein the implement includes a tip adapted to bear against the surface, the tuned circuit including a reactance that is varied in response to pressure exerted by the tip against the surface.

38. In combination, an implement including a tuned circuit with a predetermined resonant frequency, and apparatus for determining the position of the implement relative to a surface, the apparatus including:
a tablet for carrying the surface, the tablet including coils arranged in two coordinate directions,
an AC source for deriving AC energy at approximately the predetermined resonant frequency,
means for sequentially connecting coils of the tablet to the AC source, the tuned circuit interacting with the AC energy to change the AC current flowing n coils of the tablet as a function of the implement position so that the greatest changes in the AC current are in coils of the tablet closest to the implement,
means responsive to the change in AC current flowing in coils of the tablet for indicating the implement position by detecting whether a response indicative of the greatest current changes exceeds a predetermined value and for supplying AC current from the source only to the coil having the greatest change in AC current and the coils in proximity thereto.

39. The combination of claim 38 wherein the means for indicating implement position includes means for detecting the phase of the current flowing in coils of the tablet.

40. The combination of claim 38 wherein the means for indicating implement position includes means for interpolating values of current flowing in plural ones of said coils in each coordinate direction.

41. The combination of claim 38 wherein the coils are arranged as first and second arrays of loop coils positioned to extend in the two coordinate directions.

42. The combination of claim 41 wherein the loop coils of the first and second coordinate directions extend in mutually orthogonal directions.

43. The combination of claim 38 wherein the means for connecting supplies current from the AC source at the predetermined frequency during a first interval and the means for indicating is responsive to energy coupled back to coils of the tablet from the tuned circuit during a second interval while coils of the tablet are not excited by the AC energy at the predetermined frequency.

44. The combination of claim 38 wherein the implement includes a tip adapted to bear against the surface, the tuned circuit including a reactance that is varied in response to pressure exerted by the tip against the surface.

* * * * *

UNITED STATES PATENT AND TRADEMARK OFFICE
CERTIFICATE OF CORRECTION

PATENT NO.    : 5,028,745
DATED         : July 2, 1991
INVENTOR(S)   : Yamanami et al.

It is certified that error appears in the above-identified patent and that said Letters Patent is hereby corrected as shown below:

Title page,
Item [*] Notice, please delete "The portion of the term of this patent subsequent to No. 7, 2006 has been disclaimed.", and insert -- This patent is subject to a terminal disclaimer."

Signed and Sealed this

Twenty-eighth Day of September, 2004

JON W. DUDAS
*Director of the United States Patent and Trademark Office*